(12) United States Patent
Zheng et al.

(10) Patent No.: US 10,379,238 B2
(45) Date of Patent: Aug. 13, 2019

(54) INTEGRAL PACKAGING DEVICE FOR ACOUSTIC RECEIVING TRANSDUCERS WHILE DRILLING

(71) Applicant: Institute of Geology and Geophysics, Chinese Academy of Sciences, Beijing (CN)

(72) Inventors: Jian Zheng, Beijing (CN); Wenxuan Chen, Beijing (CN); Qingyun Di, Beijing (CN); Zili Wang, Beijing (CN); Yuntao Sun, Beijing (CN); Yongyou Yang, Beijing (CN); Wenxiu Zhang, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/252,671

(22) Filed: Jan. 20, 2019

(65) Prior Publication Data

US 2019/0154853 A1    May 23, 2019

Related U.S. Application Data

(63) Continuation of application No. PCT/CN2018/097793, filed on Jul. 31, 2018.

(30) Foreign Application Priority Data

Sep. 8, 2017 (CN) .......................... 2017 1 0806739

(51) Int. Cl.
*E21B 47/00* (2012.01)
*G01V 1/16* (2006.01)
(Continued)

(52) U.S. Cl.
CPC ............ *G01V 1/162* (2013.01); *E21B 47/011* (2013.01); *G01V 1/46* (2013.01)

(58) Field of Classification Search
CPC .......... E21B 7/062; E21B 7/06; E21B 47/011; G01V 1/40; G01V 1/162; G01V 1/46
See application file for complete search history.

(56) References Cited

U.S. PATENT DOCUMENTS 3,363,719 A *  1/1968  Venghiattis ............... G01V 1/46
                                                          367/25
3,401,264 A *  9/1968  Carr ....................... G01V 5/102
                                                          376/111

(Continued)

FOREIGN PATENT DOCUMENTS

CN         101833114         9/2010
CN         104486705         4/2015
(Continued)

OTHER PUBLICATIONS

International Search Report of PCT/CN2018/097793.
Written opinion of PCT/CN2018/097793.
Miscellaneous documents of PCT/CN2018/097793.

*Primary Examiner* — Hovhannes Baghdasaryan
(74) *Attorney, Agent, or Firm* — Dragon Sun Law Firm, PC; Jinggao Li, Esq.

(57) ABSTRACT

The present disclosure relates to the technical field of acoustic logging while drilling, and provides an integral packaging device for acoustic receiving transducers while drilling, wherein, the receiving transducers are directly arranged in a signal processing circuit, which is installed in an internal supporting frame fitted in a rectangular bellow; one side of the bellow has a deformable surface that is of a corrugated structure, and oil is filled in the bellow; the receiving transducers are arranged on the side that has a deformable surface; a shock absorbing rubber piece is of a (Continued)

U-shaped structure; one end of a connecting unit is connected to the signal processing circuit, and the other end of the connecting unit is connected to a main control circuit in a logging while drilling instrument. The present disclosure employs an integral packaging structure, which is easy to install structurally.

20 Claims, 1 Drawing Sheet

(51) Int. Cl.
    *E21B 47/01*    (2012.01)
    *G01V 1/46*    (2006.01)

(56) References Cited

U.S. PATENT DOCUMENTS

| | | | | |
|---|---|---|---|---|
| 3,542,150 | A * | 11/1970 | Guy | G01S 1/72 |
| | | | | 181/104 |
| 5,134,285 | A * | 7/1992 | Perry | E21B 47/011 |
| | | | | 250/254 |
| 5,852,587 | A * | 12/1998 | Kostek | G01V 1/52 |
| | | | | 367/25 |
| 5,987,385 | A * | 11/1999 | Varsamis | E21B 47/0002 |
| | | | | 702/6 |
| 2004/0066194 | A1 * | 4/2004 | Slade | G01R 33/3808 |
| | | | | 324/318 |
| 2004/0119008 | A1 * | 6/2004 | Williams | G01T 1/2002 |
| | | | | 250/256 |
| 2009/0016160 | A1 * | 1/2009 | Wassermann | G01V 11/002 |
| | | | | 367/83 |
| 2009/0183941 | A1 * | 7/2009 | Pabon | G01V 1/523 |
| | | | | 181/102 |
| 2010/0039287 | A1 * | 2/2010 | Li | G01V 11/002 |
| | | | | 340/855.7 |
| 2016/0072040 | A1 | 3/2016 | Fripp et al. | |
| 2017/0284158 | A1 * | 10/2017 | Hongbing | E21B 7/06 |
| 2018/0142551 | A1 | 5/2018 | Zheng et al. | |

FOREIGN PATENT DOCUMENTS

| | | |
|---|---|---|
| CN | 106481336 | 10/2016 |
| CN | 206299372 | 11/2016 |
| CN | 106223937 | 12/2016 |
| CN | 106522925 | 3/2017 |
| CN | 106640055 | 5/2017 |
| CN | 203961955 | 5/2017 |
| CN | 107558993 | 9/2018 |
| GB | 2430259 A | 3/2007 |
| JP | 344169462 | 9/2003 |
| WO | 2015122888 | 8/2015 |

* cited by examiner

INTEGRAL PACKAGING DEVICE FOR ACOUSTIC RECEIVING TRANSDUCERS WHILE DRILLING

CROSS-REFERENCE TO RELATED APPLICATIONS

This application is a bypass continuation application of PCT Application No. PCT/CN2018/097793. This application claims priority from PCT Application No. PCT/CN2018/097793, filed Jul. 31, 2018, and CN Application No. 201710806739.5, filed Sep. 8, 2017, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to the technical field of acoustic logging while drilling, and particularly relates to an integral packaging device for acoustic receiving transducers while drilling.

BACKGROUND OF THE DISCLOSURE

As the scale of drilling in oil and gas fields is increased and science and technology are developed continuously, especially, as logging while drilling (LWD) techniques are developed rapidly, there is an urgent need for state-of-the-art science and technology to play an important role in oil and gas field exploitation. The acoustic LWD technique is one of the LWD techniques, and acoustic receiving transducers while drilling are the most important elements of an acoustic LWD instrument. When the LWD instrument operates, acoustic waves are generated by an emitting transducer built in the instrument, and then the acoustic waves are received by receiving transducers in the same instrument. The properties of the specific medium are evaluated according to the received acoustic information, i.e., velocity and attenuation of the waves in different modes. In view that there is a water passage through which the mud can flow in the middle of the LWD instrument, the acoustic transducers are installed on the outer wall of the drill collar, and it is difficult to seal the acoustic transducers by immersing them in oil just like in the case of a cabled acoustic logging tool. Therefore, conventionally, acoustic receiving transducers while drilling are usually packaged separately. Presently, there are two types of matured acoustic receiving transducers while drilling: button-type receiving transducers and annular packaged receiving transducers. A button-type receiving transducer is directly installed in an electronic compartment at the receiving side of an acoustic LWD instrument, and such a transducer has relatively high downhole receiving sensitivity. In an annular packaged receiving transducer, multiple receiving transducers are packaged in an annular band structure, and the receiving chips are connected in shunt internally to constitute a receiving transducer. Such receiving transducers are mainly used in monopole acoustic LWD instruments.

The existing technical schemes are as follows:

Packaging device for button-type receiving transducers: in a transducer in such a structure, a ceramic crystal is packaged in a button-type metal structure, and balance between the mud outside the ceramic crystal and the hydraulic oil inside the ceramic crystal is realized by means of a hydraulic balance device in the button-type metal structure; the ceramic crystal must be dynamically sealed in the button-type structure, i.e., the pressure of the mud outside the ceramic crystal and the pressure of hydraulic oil inside the ceramic crystal should be balanced. The button-type receiving transducer is directly mounted to the frame of a receiving electronic compartment, and the electronic compartment is sealed against the external mud by means of a seal ring outside the button-type structure; at the same time, the twin-core electrical connecting contact pins on the bottom of the transducer are short-connected with a receiving circuit, and thereby weak acoustic signals can be received.

Packaging device for annular packaged receiving transducers: the transducer in such a structure employs a plate-type ceramic crystal structure, the receiving chips are packaged in an annular band, and the receiving chips are connected in shunt internally to form a receiving transducer. The signal receiving wires of the chips are led out of the annular band structure via a sealed structure, and the two signal receiving wires are electrically connected to the internal electronic compartment via a sealed electrical connecting plug that is specially designed. Such transducers encapsulated in epoxy resin can be immersed in the mud, the internal electronic compartment is sealed against the external mud by means of a specially designed sealed electrical connecting plug, and thereby weak acoustic signals can be received.

The existing technical schemes have the following drawbacks:

The packaging device for button-type receiving transducers causes increased complexity in transducer design because of the requirement for dynamic hydraulic pressure balance design of the ceramic crystal; besides, the structure may fail easily in the application; the ceramic crystal of the button-type transducer is exposed in mud and may be damaged easily in a complex downhole application environment, though a layer of PEEK material is bonded on the external surface of the ceramic crystal; in view that high-pressure sealing with the drill collar is implemented for the transducer while the transducer is mounted in the frame of the internal electronic compartment, such a structure causes increased requirements for the manufacturing and assembling of the frame of the internal electronic compartment and the external drill collar.

The packaging device for annual packaged receiving transducers requires a specially designed sealed electrical connecting plug to electrically connect to a power connection plug on the internal electronic compartment while implementing high-pressure sealing; in addition, the plug shall be secured to the drill collar in view that strong shocks and vibrations exist in the downhole operating environment. On one hand, the packaging structure requires a specially designed sealed plug; on the other hand, the packaging structure also causes increased requirements for the manufacturing and assembling of the frame of the internal electronic compartment and the external drill collar. Furthermore, compared with the packaging structure for button-type transducers, the packaging structure causes increased length of the electrical connecting wires from the transducer to the electronic compartment, and has adverse effects to signal pick-up.

Therefore, a heretofore unaddressed need exists in the art to address the aforementioned deficiencies and inadequacies.

SUMMARY OF THE DISCLOSURE

To overcome the drawbacks in the prior art, the present disclosure provides an integral packaging device for acoustic receiving transducers while drilling, which is applicable to an acoustic receiving system of a dipole or multi-pole acoustic logging while drilling (LWD) instrument.

The integral packaging device for acoustic receiving transducers while drilling in the present disclosure comprises a main body, a shock absorbing rubber piece, and a connecting unit, wherein the main body comprises several receiving transducers, a signal processing circuit, an internal supporting frame, and a rectangular bellow; the receiving transducers are directly arranged in the signal processing circuit, the signal processing circuit is installed in the internal supporting frame, and the internal supporting frame is fitted in the rectangular bellow; the entire rectangular bellow is of a hermetically-sealed structure, and is filled with oil in it; one side of the rectangular bellow has a deformable surface that is of a corrugated structure, while the rest three sides have a flat surface respectively; the receiving transducers are arranged on the side that has a deformable surface;

the shock absorbing rubber piece is of a U-shaped structure, and is wrapped on the circumference of the main body; and one end of the connecting unit is connected to the signal processing circuit, and the other end of the connecting unit is connected to a main control circuit in a logging while drilling (LWD) instrument.

Further, one end of the rectangular bellow is provided with a bellow connector, the other end of the rectangular bellow is provided with a bellow end plug, and the bellow connector and the bellow end plug are welded with the rectangular bellow integrally; the two ends of the internal supporting frame are connected with the bellow connector and the bellow end plug respectively by screws; the bellow end plug is provided with an oil inlet and an oil outlet; the rectangular bellow, the bellow connector, and the bellow end plug jointly form an enclosed space.

Further, the connecting unit comprises a first multi-core sealed contact pin, a second multi-core sealed contact pin, a connecting plug, a first seal ring, a second seal ring, a third seal ring, a retaining ring, and a multi-core rubber seal sleeve;

the first multi-core sealed contact pin is mounted on the end of the bellow connector that is connected to the internal supporting frame, one end of the first multi-core sealed contact pin is connected with a signal receiving wire of the signal processing circuit, and the other end of the first multi-core sealed contact pin is connected with a signal wire of the second multi-core sealed contact pin;

the first multi-core sealed contact pin is sealed with the bellow connector by the first seal ring, the outward end of bellow connector is connected with the connecting plug by screws; besides, the connecting plug is inserted into the bellow connector via a circular boss thereon, the second seal ring is arranged on the circular boss and makes the interior of the connecting plug and the bellow connector form a sealed space; a signal wire of the first multi-core sealed contact pin is connected to the signal wire of the second multi-core sealed contact pin mounted on the other end of the connecting plug via a through-hole in the circular boss of the connecting plug;

the second multi-core sealed contact pin is sealed with the connecting plug by the third seal ring, and the second multi-core sealed contact pin is secured to the connecting plug by the retaining ring; one end of the multi-core rubber seal sleeve is plugged against the second multi-core sealed contact pin, and the other end of the multi-core rubber seal sleeve is connected to the main control circuit inside the LWD instrument through a signal wire.

Furthermore, the receiving transducers each are of a circular plate structure, respectively and soldered to the signal processing circuit by tin soldering, are in a quantity of 6, and are arranged evenly at 152.4 mm-203 mm interval.

Further, the rectangular bellow is made of stainless steel material in 0.2 mm thickness.

Further, the shock absorbing rubber piece is bonded to the rectangular bellow with a high-temperature bonding agent.

Further, the bottom of the shock absorbing rubber piece has several trapezoid protrusions on both sides, which enable the device to slide to the mounting position along slots in a casing of the logging while drilling (LWD) instrument; the device is fixed to the casing of the logging while drilling (LWD) instrument via a cover plate and screws.

Further, the oil is silicone oil at 0.1-0.2 Mpa pressure.

Still further, the thickness of the cover plate is not greater than 3 mm on a premise that the cover plate meets a structural strength requirement.

Furthermore, the hardness of the shock absorbing rubber piece is 70, so that the receiving transducers can be decoupled from a drill collar, and thereby the disturbances of waves from the drill collar to the receiving transducers can be eliminated.

The present disclosure attains the following beneficial effects: the present disclosure employs an integral packaging structure, which is easy to install structurally; the transducers are directly mounted on a circuit board, so that the signals can be processed in real time while the signals are received by the transducers, and thereby signal interference is reduced; thus, the instrument is especially suitable for use in a downhole high-noise working environment; a bellow packaging structure is employed, and hydraulic balance with the external mud is established; a fixed cover plate of the packaging device is of a light and thin structure, so that acoustic wave penetration is improved, and thereby the receiving sensitivity of the receiving transducers in the packaging device is improved; the packaging device provides a feasible design scheme for packaging of acoustic receiving transducers while drilling, employs a reasonable and novel structural design, and has wide application prospects.

BRIEF DESCRIPTION OF DRAWINGS

The accompanying drawings illustrate one or more embodiments of the present disclosure and, together with the written description, serve to explain the principles of the invention. Wherever possible, the same reference numbers are used throughout the drawings to refer to the same or like elements of an embodiment.

In the figures: 1—multi-core rubber seal sleeve; 2—second multi-core sealed contact pin; 3—connecting plug; 4—bellow connector; 5—first multi-core sealed contact pin; 6—internal supporting frame; 7—rectangular bellow; 8—receiving transducer; 9—signal processing circuit; 10—bellow end plug; 11—oil; 12—shock absorbing rubber piece; 13—first seal ring; 14—second seal ring; 15—third seal ring; 16—retaining ring; 17—cover plate; 18—casing of logging while drilling (LWD) instrument; 19—trapezoid protrusion

DETAILED DESCRIPTION OF THE EMBODIMENTS

Hereunder the embodiments of the present disclosure will be detailed with reference to the accompanying drawings. It should be noted that the technical features or combinations of technical features described in the following embodiments shall not be deemed as separate ones; instead, they may be combined with each other to attain a better technical effect. In the accompanying drawings mentioned in the following embodiments, identical features or components are represented by the same symbols, and those symbols may be applied in different embodiments.

Figure 1:
FIG. 1 is a schematic sectional view of the integral packaging device for acoustic receiving transducers while drilling in an embodiment of the present disclosure.
Figure 2:
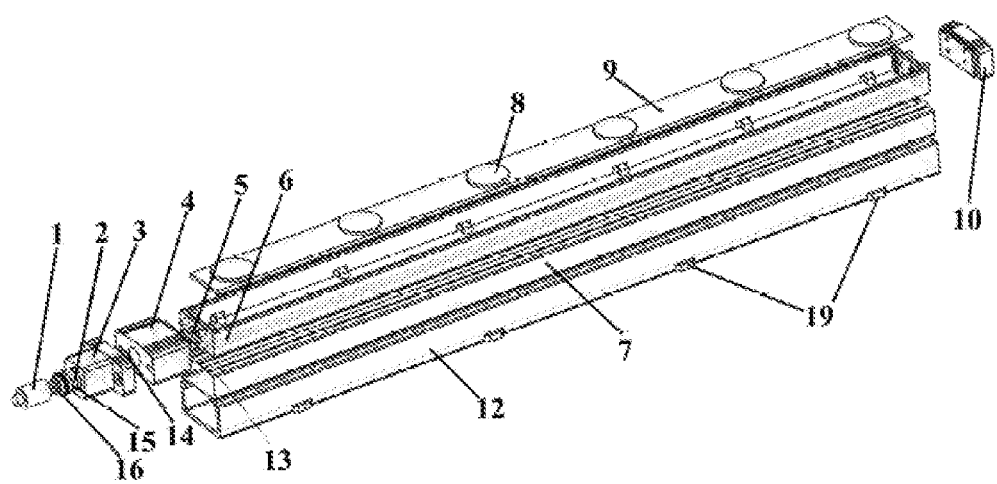
FIG. 2 is an exploded structural view of the integral packaging device for acoustic receiving transducers while drilling in an embodiment of the present disclosure.

As shown in FIGS. 1 and 2, the integral packaging device for acoustic receiving transducers while drilling in an embodiment of the present disclosure comprises a main body, a shock absorbing rubber piece 12, and a connecting unit.

The main body comprises several receiving transducers 8, a signal processing circuit (circuit board) 9, an internal supporting frame 6, and a rectangular bellow 7; the receiving transducers 8 are directly arranged in the signal processing circuit 9, and are of a circular plate structure, respectively, and soldered to the signal processing circuit 9 by tin soldering; in this embodiment, 6 receiving transducers 8 are provided, and are arranged evenly at 152.4 mm-203 mm interval; the signal processing circuit 9 is installed in the internal supporting frame 6, and may be connected with the internal supporting frame 6 by screws or other means; the internal supporting frame 6 is fitted in the rectangular bellow 7; the entire rectangular bellow 7 is of a hermetically-sealed structure, and is filled with oil 11 in it; one side of the rectangular bellow 7 has a deformable surface that is of a corrugated structure, while the rest three sides have a flat surface respectively; the receiving transducers 8 are arranged on the side that has a deformable surface.

The shock absorbing rubber piece 12 is of a U-shaped structure and wrapped on the circumference of the main body, and the deformable surface of the corrugated structure is an open surface that is not in contact with the shock absorbing rubber piece 12; preferably, the shock absorbing rubber piece 12 is bonded to the rectangular bellow 7 with a high-temperature bonding agent.

One end of the connecting unit is connected to the signal processing circuit 9, and the other end of the connecting unit is connected to a main control circuit in a logging while drilling (LWD) instrument.

Preferably, the rectangular bellow 7 is made of stainless steel having a 0.2 mm thickness; one end of the rectangular bellow 7 is provided with a bellow connector 4; the other end of the rectangular bellow 7 is provided with a bellow end plug 10; and the bellow connector 4 and the bellow end plug 10 are welded with the rectangular bellow 7 integrally; the two ends of the internal supporting frame 6 are connected with the bellow connector 4 and the bellow end plug 10 respectively by screws; the bellow end plug 10 is provided with an oil inlet and an oil outlet; the rectangular bellow 7, the bellow connector 4, and the bellow end plug 10 jointly form an enclosed space; the oil 11 is injected into the bellow via the oil inlet and the oil outlet, and there are a variety of options for the oil 11; preferably, the oil 11 is silicone oil at 0.1-0.2 Mpa pressure.

The connecting unit is used to connect the main body with the LWD instrument to ensure isolation from external mud, and may be implemented in a variety of ways; preferably, the connecting unit comprises a first multi-core sealed contact pin 5, a second multi-core sealed contact pin 2, a connecting plug 3, a first seal ring 13, a second seal ring 14, a third seal ring 15, a retaining ring 16, and a multi-core rubber seal sleeve 1;

The first multi-core sealed contact pin 5 is mounted on the end of the bellow connector 4 that is connected to the internal supporting frame 6; one end of the first multi-core sealed contact pin 5 is connected with a signal receiving wire of the signal processing circuit 9, and the other end of the first multi-core sealed contact pin 5 is connected with a signal wire of the second multi-core sealed contact pin 2;

The first multi-core sealed contact pin 5 is sealed with the bellow connector 4 by means of the first seal ring 13, and the outward end of bellow connector 4 is connected with the connecting plug 3 by screws; besides, the connecting plug 3 is inserted into the bellow connector 4 via a circular boss thereon; the second seal ring 14 is arranged on the circular boss and makes the interior of the connecting plug 3 and the bellow connector 4 form a sealed space; a signal wire of the first multi-core sealed contact pin 5 is connected to the signal wire of the second multi-core sealed contact pin 2 mounted on the other end of the connecting plug 3 via a through-hole in the circular boss of the connecting plug 3.

The second multi-core sealed contact pin 2 is sealed with the connecting plug 3 by means of the third seal ring 15, and the second multi-core sealed contact pin 2 is secured to the connecting plug 3 by the retaining ring 16; one end of the multi-core rubber seal sleeve 1 is plugged against the second multi-core sealed contact pin 2, and the other end of the multi-core rubber seal sleeve 1 is connected to the main control circuit inside the LWD instrument through a signal wire.

Figure 3:
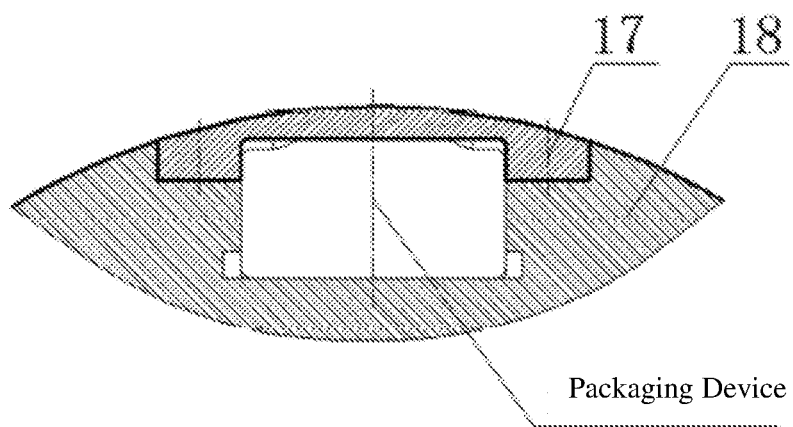
FIG. 3 is a schematic diagram illustrating the connection relation between the packaging device and a logging while drilling (LWD) instrument.

Preferably, the bottom of the shock absorbing rubber piece 12 has several trapezoid protrusions 19 on both sides, which enable the device to slide to the mounting position along slots in a casing 18 of the LWD instrument; the device is fixed to the casing 18 of the LWD instrument via the cover plate 17 by screws, as shown in FIG. 3; the thickness of the cover plate 17 is not greater than 3 mm on a premise that the cover plate 17 meets a structural strength requirement. Preferably, the hardness of the shock absorbing rubber piece 12 is 70, so that the receiving transducers 8 can be decoupled from a drill collar, and thereby the disturbances of waves from the drill collar to the receiving transducers 8 can be eliminated.

In the present disclosure, plate-shaped cable acoustic wave receiving transducers 8 are directly packaged in a signal processing circuit (board) 9, and an enclosed space is formed by a rectangular bellow 7, a bellow connector 4, an internal supporting frame 6, a bellow end plug 10, and a first multi-core sealed contact pin 5, and oil 11 is filled into the enclosed space via an oil inlet and an oil outlet on the bellow end plug 10; since the rectangular bellow 7 is used and the corrugated surface of the rectangular bellow 7 can be deformed as the external pressure varies, the silicone oil (oil 11) in the rectangular bellow 7 may be compressed, and the pressure in the enclosed space may be increased, till the pressure of the silicone oil inside the enclosed space is equal to the pressure of the external mud, and thereby a hydraulic balancing system is formed for the integral packaging device for acoustic receiving transducers while drilling; the hydraulic balancing system can realize hydraulic balance in the internal environment as the environmental pressure of external mud varies. In practical applications of the packaging device for acoustic receiving transducers while drilling, the cover plate 17 may be thin as far as possible (3 mm or thinner) on a premise of meeting the structural strength requirement, and thereby acoustic signal penetration can be improved, and the receiving sensitivity of the receiving transducer can be improved.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An integral packaging device for acoustic receiving transducers while drilling, wherein, comprising:
    a main body;
    a shock absorbing rubber piece; and
    a mechanical connecting unit, wherein
    the main body comprises a plurality of receiving transducers of the acoustic receiving transducers, a signal processing circuit, an internal supporting frame, and a rectangular bellow;
    the receiving transducers are directly arranged in the signal processing circuit;
    the signal processing circuit is installed in the internal supporting frame;
    the internal supporting frame is fitted in the rectangular bellow;
    the rectangular bellow is of a hermetically-sealed structure and is filled with oil;
    one side of the rectangular bellow has a deformable surface that is of a corrugated structure, while three other sides of the rectangular bellow each have a flat surface respectively;
    the receiving transducers are arranged on the one side that has the deformable surface;
    the shock absorbing rubber piece is of a U-shaped structure and is wrapped on the circumference of the main body; and
    one end of the mechanical connecting unit is connected to the signal processing circuit, and the other end of the mechanical connecting unit is connected to a main control circuit in a logging while drilling instrument.

2. The device according to claim 1, wherein one end of the rectangular bellow is provided with a bellow connector;
    the other end of the rectangular bellow is provided with a bellow end plug;
    the bellow connector and the bellow end plug are welded with the rectangular bellow integrally;
    two ends of the internal supporting frame are connected with the bellow connector and the bellow end plug, respectively, by screws;
    the bellow end plug is provided with an oil inlet and an oil outlet; and
    the rectangular bellow, the bellow connector, and the bellow end plug jointly form an enclosed space.

3. The device according to claim 2, wherein the mechanical connecting unit comprises a first multi-core sealed contact pin, a second multi-core sealed contact pin, a connecting plug, a first seal ring, a second seal ring, a third seal ring, a retaining ring, and a multi-core rubber seal sleeve;
    the first multi-core sealed contact pin is mounted on one end of the bellow connector that is connected to the internal supporting frame, one end of the first multi-core sealed contact pin is connected with a signal receiving wire of the signal processing circuit, and the other end of the first multi-core sealed contact pin is connected with a signal wire of the second multi-core sealed contact pin;
    the first multi-core sealed contact pin is sealed with the bellow connector by the first seal ring, and the outward end of bellow connector is connected with the connecting plug by screws; the connecting plug is inserted into the bellow connector via a circular boss thereon; the second seal ring is arranged on the circular boss and makes the interior of the connecting plug and the bellow connector form a sealed space; a signal wire of the first multi-core sealed contact pin is connected to the signal wire of the second multi-core sealed contact pin mounted on the other end of the connecting plug via a through-hole in the circular boss of the connecting plug; and
    the second multi-core sealed contact pin is sealed with the connecting plug by the third seal ring; the second multi-core sealed contact pin is secured to the connecting plug by the retaining ring; one end of the multi-core rubber seal sleeve is plugged against the second multi-core sealed contact pin, and the other end of the multi-core rubber seal sleeve is connected to the main control circuit inside the logging while drilling instrument through a signal wire.

4. The device according to claim 1, wherein the receiving transducers are of a circular plate structure respectively and soldered to the signal processing circuit by tin soldering, are in a quantity of 6, and are arranged evenly at 152.4 mm-203 mm interval.

5. The device according to claim 1, wherein the rectangular bellow is made of stainless steel with a thickness of 0.2 mm.

6. The device according to claim 1, wherein, the shock absorbing rubber piece is bonded to the rectangular bellow with a high-temperature bonding agent.

7. The device according to claim 2, wherein, the shock absorbing rubber piece is bonded to the rectangular bellow with a high-temperature bonding agent.

8. The device according to claim 5, wherein, the shock absorbing rubber piece is bonded to the rectangular bellow with a high-temperature bonding agent.

9. The device according to claim 1, wherein the bottom of the shock absorbing rubber piece has a plurality of trapezoid protrusions on both sides that enable the device to slide to the mounting position along slots in a casing of the logging while drilling instrument; and the device is fixed to the casing of the logging while drilling instrument via a cover plate and screws.

10. The device according to claim 2, wherein the bottom of the shock absorbing rubber piece has a plurality of trapezoid protrusions on both sides that enable the device to slide to the mounting position along slots in a casing of the logging while drilling instrument; and the device is fixed to the casing of the logging while drilling instrument via a cover plate and screws.

11. The device according to claim 3, wherein, the bottom of the shock absorbing rubber piece has a plurality of trapezoid protrusions on both sides that enable the device to slide to the mounting position along slots in a casing of the logging while drilling instrument; and the device is fixed to the casing of the logging while drilling instrument via a cover plate and screws.

12. The device according to claim 1, wherein the oil is silicone oil at 0.1-0.2 MPa pressure.

13. The device according to claim 7, wherein the cover plate has a thickness; and the thickness of the cover plate is not greater than 3 mm on a premise that the cover plate meets a structural strength requirement.

14. The device according to claim 1, wherein the hardness of the shock absorbing rubber piece is 70, so that the receiving transducers can be decoupled from a drill collar, and thereby the disturbances of waves from the drill collar to the receiving transducers can be eliminated.

15. The device according to claim 2, wherein the hardness of the shock absorbing rubber piece is 70, so that the receiving transducers can be decoupled from a drill collar, and thereby the disturbances of waves from the drill collar to the receiving transducers can be eliminated.

16. The device according to claim 3, wherein the hardness of the shock absorbing rubber piece is 70, so that the receiving transducers can be decoupled from a drill collar, and thereby the disturbances of waves from the drill collar to the receiving transducers can be eliminated.

17. The device according to claim 4, wherein the hardness of the shock absorbing rubber piece is 70, so that the receiving transducers can be decoupled from a drill collar, and thereby the disturbances of waves from the drill collar to the receiving transducers can be eliminated.

18. The device according to claim 5, wherein the hardness of the shock absorbing rubber piece is 70, so that the receiving transducers can be decoupled from a drill collar, and thereby the disturbances of waves from the drill collar to the receiving transducers can be eliminated.

19. The device according to claim 12, wherein the hardness of the shock absorbing rubber piece is 70, so that the receiving transducers can be decoupled from a drill collar, and thereby the disturbances of waves from the drill collar to the receiving transducers can be eliminated.

20. The device according to claim 13, wherein the hardness of the shock absorbing rubber piece is 70, so that the receiving transducers can be decoupled from a drill collar, and thereby the disturbances of waves from the drill collar to the receiving transducers can be eliminated.

\* \* \* \* \*